(No Model.)

W. L. VANDERPLOEG.
SHAPING MACHINE.

No. 498,733. Patented May 30, 1893.

Witnesses
C. W. Miles
T. Simmons

Inventor
William L. Vanderploeg
By Wood & Boyd
Attorneys

UNITED STATES PATENT OFFICE.

WILLIAM LOUIS VANDERPLOEG, OF XENIA, OHIO, ASSIGNOR TO R. A. KELLY & CO., OF SAME PLACE.

SHAPING-MACHINE.

SPECIFICATION forming part of Letters Patent No. 498,733, dated May 30, 1893.

Application filed November 1, 1892. Serial No. 450,641. (No model.)

*To all whom it may concern:*

Be it known that I, WILLIAM LOUIS VANDERPLOEG, a citizen of the United States, residing at Xenia, in the county of Greene and State of Ohio, have invented certain new and useful Improvements in Shaping-Machines, of which the following is a specification.

My invention relates to an improvement on shaping machines which are driven by a crank motion.

The object and features of my invention are fully set forth in the description of the accompanying drawings making a part of this specification, in which—

Figure 1:
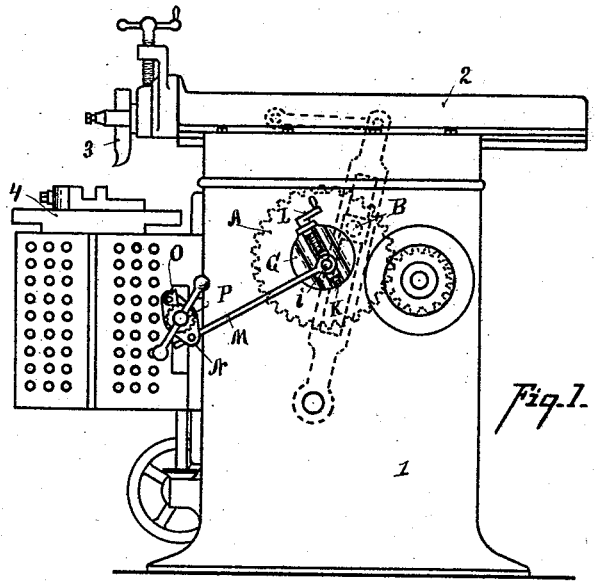
Figure 2:
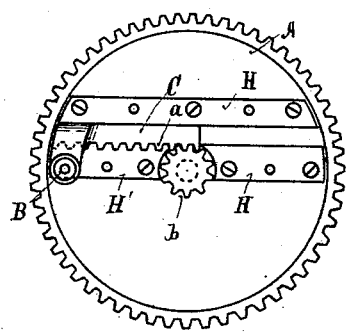
Figure 3:
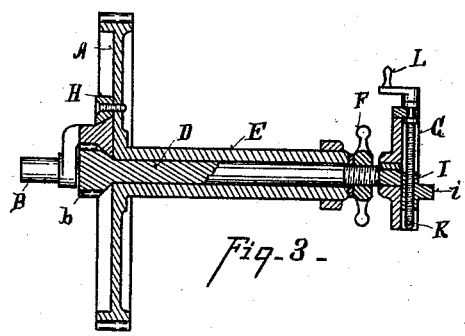
Figure 4:
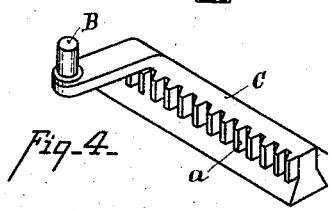

Figure 1 is a side elevation of the shaping machine with my improvement attached thereto. Fig. 2 is a plan view of the face wheel and adjustable crank pin mechanism. Fig. 3 is a section on line $x$, $x$, Fig. 2. Fig. 4 is a perspective view of the crank pin rack.

1 represents the frame of an ordinary shaping machine; 2, the tool carriage; 3, the tool; 4, the table on which the work is adjusted. These parts are of ordinary construction.

My invention relates to the method of driving the carriage and tool and adjustment of the throw thereof.

A represents an ordinary face plate wheel. B represents the crank pin; it is mounted upon a rack bar C, which is held in place by a bevel or dovetail engagement with the guides H H'; the teeth of said rack bar C engaging with the teeth of the spur gear $b$, which is formed integral with the shaft D. The inner face of the gear $b$ is beveled and fits the bevel of the rack bar C.

F represents a set nut which engages with the threads on the shaft D outside of the sleeve E. When it is turned up it draws the inclined bevel $b$ and the rack bar C firmly against the disk of the face plate wheel A, and locks the shaft D to the sleeve, and also the rack bar carrying the crank pin B rigidly in position.

When it is desired to adjust the crank pin B for a greater length of throw the nut F is slackened, the crank pin adjusted by revolving the shaft D which moves the rack bar across the axis of said shaft and setting the crank pin B in or out as desired.

G represents a feed block which is keyed to the outer end of shaft D; this feed block carries a dove-tail block I from which projects a crank pin $i$; this dove-tail block moves in ways formed in the feed block G and is driven by a screw K tapped through said block I.

L represents a crank for turning the screw K to adjust the crank pin $i$ eccentrically to the axis of shaft D.

M represents a pitman journaling on crank pin $i$ and transmitting motion to the oscillating pawl block N, which journals upon the feed shaft.

O represents the pawl and P the ratchet wheel for transmitting feed to the carriage 4. These last named parts are of the ordinary construction.

By the means herein shown the throw of the pitman M by adjustment of the crank pin $i$ may be regulated at pleasure and the speed of the feeding of the table varied at will. By the means herein described the length of stroke of the shaper tool, and the rapidity of the feed may be varied at will, and the parts readily adjusted and locked to the desired adjustment.

Having described my invention, what I claim is—

1. In a shaping machine, in combination with the face wheel A, the shaft D journaling in sleeve E and provided with the incline gear $b$ seated in a recess of the face wheel A, and meshing with the rack bar C mounted on the disk of the face wheel, the crank pin B mounted on said rack bar, lock nut F engaging on the threaded end of shaft D, the crank pin I supported in feed block G, and mechanism for adjusting said crank pin eccentrically to shaft D, substantially as described.

2. In a shaping machine, the combination with a feed carriage 4, and a tool 3, of a face wheel A having guides H and H', a rectilinearly sliding rack C engaged with the guides and having at one end a crank pin B, a shaft D having a pinion $b$ which bears against the outer side of the rack and engages the latter to clamp it in a fixed position relatively to the face wheel, a feed block G on the outer end of the shaft, a block I, adjustable on the feed block and having a crank pin $i$, means for adjusting the block carrying the crank pin, a pitman M, and a pawl block N, substantially as described.

3. In a shaping machine, the combination with a carriage 4, and a tool 3, of a face wheel A having guides H and H', a sliding rack C engaged with the guides and having at one end a crank pin B, a shaft D having a pinion b which bears against the outer side of the rack and engages the latter to clamp it in a fixed position relatively to the face wheel, a feed block G on the outer end of the shaft, a block I adjustable on the feed block and having a crank pin i, an adjusting screw K carried by the feed block for adjusting the block which carries the crank pin, a pitman M, and pawl block N, substantially as described.

In testimony whereof I have hereunto set my hand.

WILLIAM LOUIS VANDERPLOEG.

Witnesses:
CHARLES DURLUGIN,
F. N. SHAFFER.